US007630955B2

United States Patent
(12) United States Patent
Byrd et al.

(10) Patent No.: US 7,630,955 B2
(45) Date of Patent: Dec. 8, 2009

(54) APPARATUS, SYSTEM, AND METHOD FOR ANALYZING THE ASSOCIATION OF A RESOURCE TO A BUSINESS PROCESS

(75) Inventors: Stephen A. Byrd, San Jose, CA (US); Steven Czerwinski, Berkeley, CA (US); J. Kristofer Fox, San Luis Obispo, CA (US); Bruce Light Hillsberg, San Carlos, CA (US); Bernhard Julius Klingenberg, Morgan Hill, CA (US); Rajesh Francisco Krishnan, San Jose, CA (US); Balaji Thirumalai, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 10/915,133

(22) Filed: Aug. 10, 2004

(65) Prior Publication Data

US 2006/0036405 A1 Feb. 16, 2006

(51) Int. Cl.
*G06F 7/00* (2006.01)
*G06F 11/30* (2006.01)
*G06N 5/00* (2006.01)

(52) U.S. Cl. ............................. 707/1; 707/10; 707/100; 707/103 X; 707/104.1; 707/205; 702/186; 706/45

(58) Field of Classification Search ................. 707/1–7; 705/7; 713/182; 711/170; 717/110
See application file for complete search history.

(56) References Cited

U.S. PATENT DOCUMENTS 5,166,939 A 11/1992 Jaffe et al. ................. 371/40.1
5,367,671 A 11/1994 Feigenbaum ................ 395/600
5,432,937 A 7/1995 Tevanian et al. ............ 395/700
5,457,797 A 10/1995 Butterworth et al. ........ 395/650

(Continued)

FOREIGN PATENT DOCUMENTS

EP 1211596 6/2002

(Continued)

OTHER PUBLICATIONS

Jeong et al., On-board Task Scheduling Algorithm for Spacecraft, Apr. 24-28, 2000, IEEE, vol. 2, pp. 1182-1187.*

(Continued)

*Primary Examiner*—Apu M Mofiz
*Assistant Examiner*—Jessica N Le
(74) *Attorney, Agent, or Firm*—Kunzler & McKenzie

(57) ABSTRACT

An apparatus, system, and method are provided for analyzing the association of a resource to a business process. The invention includes an origination module, an evaluation module, and an identification module. The origination module receives an identifier and derives a seed resource associated with the identifier. The evaluation module applies heuristic routines to trace data and derives a set of candidate resources, and each heuristic routine assigns each candidate resource a probability value. The evaluation module further combines the probabilities for each candidate resource into a combined probability. The identification module identifies a resource associated to a business process by examining the combined probability of a candidate resource with a threshold value. The heuristic routines, thresholds, techniques for combining probabilities and the like are modifiable to accommodate user needs and system changes over time.

22 Claims, 6 Drawing Sheets

600
Begin 610
Receive identifier for a business process 615
Determine resource related to identifier 620
Assign resource to a logical application 625
Apply heuristic routines to trace data associated with logical application 630
Derive set of candidate resources 635
Assign a probability from each heuristic routine to each candidate resource 640
Combine probabilities 645
Meet Threshold? 650
Yes
Identify as member of logical application 655
No
Membership Change? 660
Yes
No
End 665

U.S. PATENT DOCUMENTS 5,600,778 A 2/1997 Swanson
5,623,404 A * 4/1997 Collins et al. ................. 705/9
5,689,700 A 11/1997 Miller et al. ................ 395/610
5,764,911 A 6/1998 Tezuka et al. .......... 395/200.53
5,794,224 A * 8/1998 Yufik .......................... 706/14
5,826,239 A 10/1998 Du et al.
5,845,293 A 12/1998 Veghte et al. ............... 707/202
5,862,381 A 1/1999 Advani
5,890,132 A 3/1999 Sanders ......................... 705/7
5,930,789 A 7/1999 Agrawal et al. ................ 707/6
5,950,199 A 9/1999 Schmuck et al. ............... 707/8
5,958,003 A * 9/1999 Preining et al. ............ 718/100
6,076,105 A 6/2000 Wolff et al. ................ 709/223
6,078,912 A * 6/2000 Buerger et al. ................ 707/1
6,098,052 A * 8/2000 Kosiba et al. ................ 705/40
6,098,074 A 8/2000 Cannon et al. ............. 707/200
6,125,442 A 9/2000 Maves et al. ............... 712/220
6,182,122 B1 1/2001 Berstis ....................... 709/217
6,195,622 B1 * 2/2001 Altschuler et al. ............ 703/2
6,256,648 B1 * 7/2001 Hill et al. ................ 715/501.1
6,259,448 B1 7/2001 McNally et al.
6,275,977 B1 8/2001 Nagai et al. .................... 717/1
6,393,386 B1 5/2002 Zager et al.
6,484,177 B1 11/2002 Van Huben et al. ........... 707/10
6,526,442 B1 2/2003 Stupek, Jr. et al. .......... 709/224
6,601,035 B1 7/2003 Panagos et al.
6,615,225 B1 9/2003 Cannon et al. ............. 707/204
6,691,067 B1 2/2004 Ding et al.
6,928,431 B2 8/2005 Dettinger et al.
7,065,566 B2 6/2006 Menard et al.
7,065,624 B1 * 6/2006 Zahavi ....................... 711/170
7,203,747 B2 * 4/2007 Bhat et al. ................. 709/224
7,275,020 B2 * 9/2007 Sutton ........................ 702/186
7,406,475 B2 7/2008 Dome et al.
2002/0069236 A1 6/2002 Jahnke
2002/0138559 A1 9/2002 Ulrich et al. ................ 709/203
2002/0147735 A1 10/2002 Nir ........................... 707/200
2002/0174000 A1 11/2002 Katz et al.
2002/0178436 A1 * 11/2002 Mastrianni et al. .......... 717/110
2002/0188592 A1 12/2002 Leonhardt et al. .............. 707/1
2002/0188605 A1 12/2002 Adya et al. .................... 707/4
2002/0188733 A1 12/2002 Collins et al. ............... 709/229
2003/0023713 A1 1/2003 Slater et al. ................. 709/223
2003/0023949 A1 1/2003 Hagmeier et al. ........... 717/101
2003/0061129 A1 3/2003 Todd et al. .................... 705/29
2003/0110263 A1 6/2003 Shillo ......................... 709/226
2003/0110513 A1 6/2003 Plourde, Jr. et al. ......... 725/134
2003/0126265 A1 7/2003 Aziz et al. .................. 709/227
2003/0149756 A1 8/2003 Grieve et al. ................ 709/223
2003/0149761 A1 8/2003 Baldwin et al. ............. 709/224
2003/0149770 A1 8/2003 Delaire et al. ............... 709/226
2003/0154238 A1 8/2003 Murphy et al. .............. 709/201
2003/0187860 A1 10/2003 Holland ...................... 707/100
2003/0191911 A1 10/2003 Kleinschnitz, Jr. et al. .. 711/154
2003/0204562 A1 10/2003 Hwang ....................... 709/203
2004/0025162 A1 2/2004 Fisk
2004/0034543 A1 2/2004 Bartsch
2004/0054850 A1 * 3/2004 Fisk ........................... 711/112
2004/0088375 A1 * 5/2004 Sethi et al. .................. 709/218
2004/0098229 A1 * 5/2004 Error et al. .................. 702/186
2004/0107414 A1 6/2004 Bronicki
2004/0111309 A1 * 6/2004 Matheson et al. .............. 705/8
2004/0215621 A1 * 10/2004 Harvey et al. ................. 707/10
2005/0076138 A1 4/2005 Sterne
2005/0096877 A1 * 5/2005 Shimazaki et al. .......... 702/186
2005/0119905 A1 6/2005 Wong et al.
2005/0144051 A1 * 6/2005 Wilson .......................... 705/7
2005/0144072 A1 6/2005 Perkowski
2005/0210262 A1 * 9/2005 Rolia et al. ................. 713/182
2005/0216282 A1 9/2005 Chen et al.
2005/0257085 A1 * 11/2005 Haustein et al. ............... 714/13
2006/0282534 A1 * 12/2006 Berg .......................... 709/225
2008/0021874 A1 * 1/2008 Dahl et al. ..................... 707/3
2008/0028409 A1 * 1/2008 Cherkasova et al. ......... 718/104

FOREIGN PATENT DOCUMENTS

JP 2001014188 6/1999
WO 01/27762 A1 4/2001
WO 01/47182 A2 6/2001
WO 03/005165 1/2003

OTHER PUBLICATIONS

Raut et al., Enterprise Business Process Integration, Oct. 15-17, 2003, IEEE, vol. 4, pp. 1549-1553.*

Jeong, Il-Jun, "On-board Task Scheduling Algorithm for Spacecraft," Proceedings of the 2000 IEEE International Conference on Robotics & Automation, San Francisco CA, Apr. 2000.

Raut, Ashutosh, "Enterprise Business Process Integration," IEEE, c 2003.

"Filter Drivers", Kernel-Mode Driver Architecture: Windows DDK; http://msdn.microsoft.com/library/enus/kmarch/hh/kmarch/wdmintro_7dpj.asp?frame=true Oct. 6, 2003.

"Types of WDM Drivers", Kernel-Mode Driver Architecture: Windows DDK; http://msdn.microsoft.com/library/enus/kmarch/hh/kmarch/wdmintro_3ep3.asp?frame=true Oct. 6, 2003.

"Event Tracker for Windows-Details", http://www.eventlogmanagercom/details.htm Mar. 24, 2004.

"Event Tracker for Windows-Feature List", http://www.eventlogmanager.com/feature-list.htm Mar. 24, 2004.

Ed Frauenheim, "HP unveils data management effort",Sep. 16, 2003, http://news.com.com/2102-1011 3-5077651.html.

"Automated Resource Management", Technology Brief Aug. 2002, The Enterprise Storage Group, pp. 1-3.

"Novator Open File Manager", http://www.hallogram.com/novastoroper Feb. 23, 2004.

Johan Moe et al., "Using execution trace data to improve distribute systems", The ACM Digital Library, http://portal.acm.org/ Jul. 2002.

* cited by examiner

APPARATUS, SYSTEM, AND METHOD FOR ANALYZING THE ASSOCIATION OF A RESOURCE TO A BUSINESS PROCESS

BACKGROUND OF THE INVENTION

1. Field of the Invention

The invention relates to enterprise information systems. Specifically, the invention relates to apparatus, systems, and methods for analyzing the association of a resource to a business process.

2. Description of the Related Art

Computer and information technology continues to progress and grow in its capabilities and complexity. In particular, software applications have evolved from single monolithic programs to many hundreds or thousands of object oriented components that can execute on a single machine or distributed across many computer systems on a network.

Computer software and its associated data is generally stored in persistent storage organized according to some format such as a file. Generally, the file is stored in persistent storage such as a Direct Access Storage Device. (DASD i.e. a number of hard drives). Even large database management systems employ some form of files to store the data as well as the object code for executing the database management system.

Computer software generally separates functional modules from data produced or used by those modules. Recent technologies such as eXtended Markup Language (XML) blend instructions to a client or server module with data and metadata such that the line between object code and data can be blurred.

Business owners, executives, managers, administrators and the like concentrate on providing products and/or services in a cost effective and efficient manner. These business executives recognize the efficiency and advantages software applications can provide. Consequently, business people factor in the business software applications in long range planning and policy making to ensure that the business remains competitive in the market place.

Instead of concerning themselves with details such as the architecture and files defining a software application, business people are concerned with business processes. Business processes are internal and external services provided by the business. More and more of these business processes are provided at least in part by one or more software applications. One example of a business process is internal communication among employees. Often this business process is implemented largely by an email software application. The email software application may include a plurality of separate executable software components such as a client, a server, a Database Management System (DBMS), and the like.

Generally, business people manage and lead most effectively when they focus on business processes instead of working with confusing and complicated details about how a business process is implemented. Unfortunately, the relationship between a business process policy and its implementation is generally undefined, particularly in large corporations. Consequently, the affects of the business policy must be researched and explained so that the burden imposed by the business process policy can be accurately compared against the expected benefit.

FIG. 1 illustrates a conventional system 100 for implementing a business process. The business process may be any business process. Examples of business processes that rely heavily on software applications include an automated telephone and/or Internet retail sales system (web storefront), an email system, an inventory control system, an assembly line control system, and the like.

Generally, a business process is simple and clearly defined. Often, however, the business process is implemented using a variety of cooperating software applications comprising various executable files, data files, clients, servers, agents, daemons/services, and the like from a variety of vendors. These software applications are generally distributed across multiple computer platforms.

In the example system 100, an E-commerce website is illustrated with components executing on a client 102, a web server 104, an application server 106, and a DBMS 108. To meet system 100 requirements, developers write a servlet 110 and applet 112 provided by the web server 104, one or more business objects 114 on the application server 106, and one or more database tables 116 in the DBMS 108. These separate software applications interact to provide the E-commerce website.

As mentioned above, each software application originates from, or uses, one or more files 118 that store executable object code. Similarly, data files 120 store data used by the software application. The data files 120 may store configuration settings, user data, system data, database rows and columns, or the like.

Together, these files constitute resources required to implement the business process. In addition, resources may include Graphical User Interface (GUI) icons and graphics, static web pages, web services, web servers, general servers, and other resources accessible on other computer systems (networked or independent) using Uniform Resource Locators (URLs) or other addressing methods. Collectively, all of these various resources are required in order to implement all aspects of the business process. As used herein, "resource(s)" refers to all files containing both object code and data as well as software modules used by the one or more software applications to perform the functions of the business process.

Generally, each of the files 118, 120 is stored on a storage device 122*a-c* identified by either a physical or virtual device or volume. The files 118, 120 are managed by separate file systems (FS) 124*a-c* corresponding to each of the platforms 104, 106, 108.

Suppose a business manager wants to implement a business level policy 126 regarding the E-commerce website. The policy 126 may simply state: "Backup the E-commerce once a week." Of course other business level policies may be implemented with regard to the E-commerce website. For example, a load balancing policy, a software migration policy, a software upgrade policy, and other like business policies can be defined for the business process at the business process level.

Such business level policies are clear and concise. However, implementing the policies can be very labor intensive, error prone, and difficult. Generally, there are two approaches for implementing the backup policy 126. The first is to backup all the data on each device or volume 122*a-c*. However, such an approach backs up files unrelated to the particular business process when the device 122*a-c* is shared among a plurality of business processes. Certain other business policies may require more frequent backups for other files on the volume 122*a-c* related to other business processes. Consequently, the policies conflict and may result in wasted backup storage due to duplicate data. In addition, the time required to perform a full copy of the devices 122*a-c* may interfere with other business processes and unnecessarily prolong the process.

The second approach is to identify which files on the devices 122*a-c* are used by, affiliated with, or otherwise comprise the business process. Unfortunately, there is not automatic process for determining what all the resources are that are used by the business process, especially business processes that are distributed across multiple systems. Certain logical rules can be defined to assist in this manual process. But, these rules are often rigid and limited in their ability to accurately identify all the resources. For example, such rules will likely miss references to a file on a remote server by a URL during execution of an infrequent feature of the business process.

Generally, a computer system administrator must interpret the business level policy 126 and determine which files 118, 120 must be included to implement the policy 126. The administrator may browse the various file systems 124*a-c*, consult user manuals, search registry databases, and rely on his/her own experience and knowledge to generate a list of the appropriate files 118, 120.

In FIG. 1, the implementation 128 illustrates the results of this manual, labor intensive, and tedious process. Such a process is very costly due to the time required not only to create the list originally, but also to continually maintain the list as various software components of the business process are upgraded and modified. In addition, the manual process is susceptible to human error. The administrator may unintentionally omit certain files 118, 120.

The implementation 128 includes both object code files 118 (i.e. e-commerce.exe. Also referred to as executables) and data files 120 (i.e. e-comdata1.db. Also referred to as data files). However, due to the manual nature of the process and storage space concerns, efforts may be concentrated on the data files 120 and data specific resources. The data files 120 may be further limited to strictly the critical data files 120 such as database files. Consequently, other important files such as executables and user configuration and system specific setting files may not be included in the implementation 128. Alternatively, user data such as word processing documents may also be missed because the data is stored in an unknown or unpredictable location on the devices 122*a-c*.

Other solutions for grouping resources used by a business process have limitations. One solution is for each software application that is installed to report to a central repository what resources the application uses. However, this places the burden of tracking and listing the resources used on one or more developer who write and maintain the software applications. Again human error can result in certain files being excluded. In addition, such reporting is generally only done during the installation. Consequently, data files created after that time may be stored in unforeseeable locations on a device 122*a-c*.

From the foregoing discussion, it should be apparent that a need exists for an apparatus, system, and method that automatically analyzes an association of a file or other resource to a business process. Beneficially, such an apparatus, system, and method would automatically discover substantially all the resources used by a business process such that a business level policy can be applied to the business process as a whole. Such an apparatus, system, and method would use an identifier and/or various characteristics or a single resource to identify an initial resource associated with the business process. From the initial resource, all other associated resources would be automatically identified. In addition, the apparatus, system, and method would apply heuristic routines to ensure that all the appropriate resources are included. Furthermore, the set of resources identified as affiliated with a business process would be modifiable to accommodate user needs and system changes over time.

SUMMARY OF THE INVENTION

The present invention has been developed in response to the present state of the art, and in particular, in response to the problems and needs in the art that have not yet been met for automatically analyzing the association of files and other resources to a business process. Accordingly, the present invention has been developed to provide an apparatus, system, and method for automatically analyzing the association of a resource to a business process that overcomes many or all of the above-discussed shortcomings in the art.

An apparatus according to the present invention includes an evaluation module and an identification module. The evaluation module applies one or more heuristic routines to trace data associated with a logical application representative of a business process to derive a set of candidate resources. The evaluation module may add or remove resources from the set of candidate resources in response to a result from a heuristic routine. Each heuristic routine assigns a probability to each candidate resource, and the evaluation module combines the probability values assigned to a candidate resource to define a combined probability value for the candidate resource.

As used herein, “logical application” refers to a set of all files and other resources required to provide the business level services defined for a business process. The term “logical” combined with “application” is intended to include software applications which may be distributed across many computer system, but is not limited to this interpretation.

In some embodiments, an origination module receives a business process identifier that is used to identify a resource that becomes an initial member of the logical application. The origination module may search system information in order to determine the resource related to the business process identifier. In certain embodiments, the business process is identified by an identifier or a characteristic of the software application.

The identifier or characteristic may be provided through an interface. The identifier may comprise the name of an executable file or data file. The characteristic may comprise a well-known function performed by the software application. Preferably, the function is specific to the particular business process. For example, the software application may perform network communications using a well-known port number or communicate with a particular server or software module. Preferably, the identifier or characteristic is unique to the particular business process and clearly definable.

The identification module examines the set of candidate resources by applying a threshold to the combined probability value of each candidate resource, and identifies the candidate resources that satisfy a threshold value to be members of an expanded logical application. In one embodiment, the evaluation module and the identification module operate iteratively on the expanded logical application to ensure that all appropriate files are identified.

A method of the present invention is also presented for automatically analyzing the association of a resource to a business process. In one embodiment, the method includes receiving an identifier for a business process. Then, system data is examined to determine a resource that implements the business process that is directly related the identifier, and the resource is assigned to a logical application. Next, heuristic routines are applied to trace data associated with the logical application, and a set of candidate resources are derived as a result of the heuristic routines.

Each heuristic routine assigns a probability to each of the candidate resources, and the probabilities are combined to produce a combined probability value for each candidate resource. If a candidate resource's combined probability value exceeds a threshold value, the candidate resource is identified as a member of the logical application. The method may iterate until substantially all members of the logical application have been identified.

The present invention also includes embodiments arranged as a system, and machine-readable instructions that comprise substantially the same functionality as the components and steps described above in relation to the apparatus and method. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
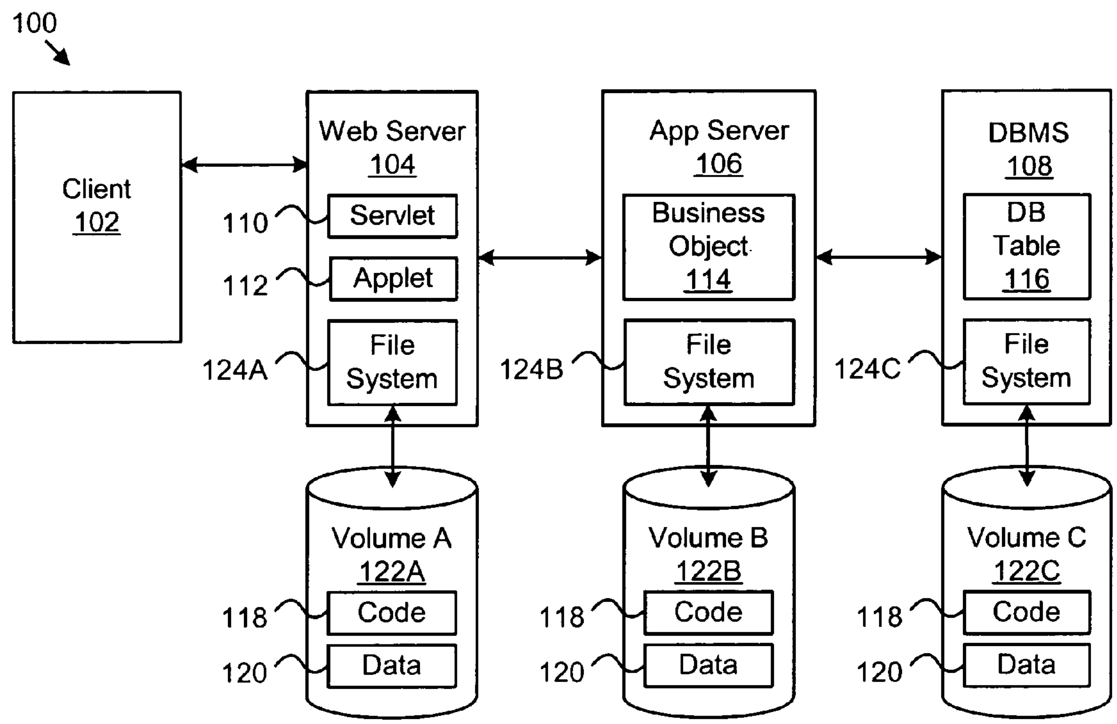
FIG. 1 is a block diagram illustrating one example of how a business level policy is conventionally implemented.
Figure 1:
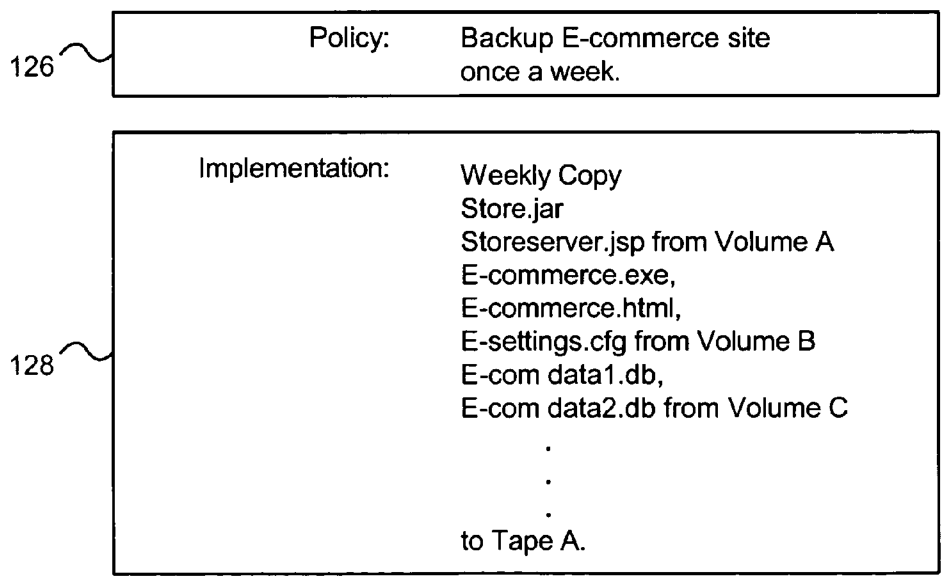

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
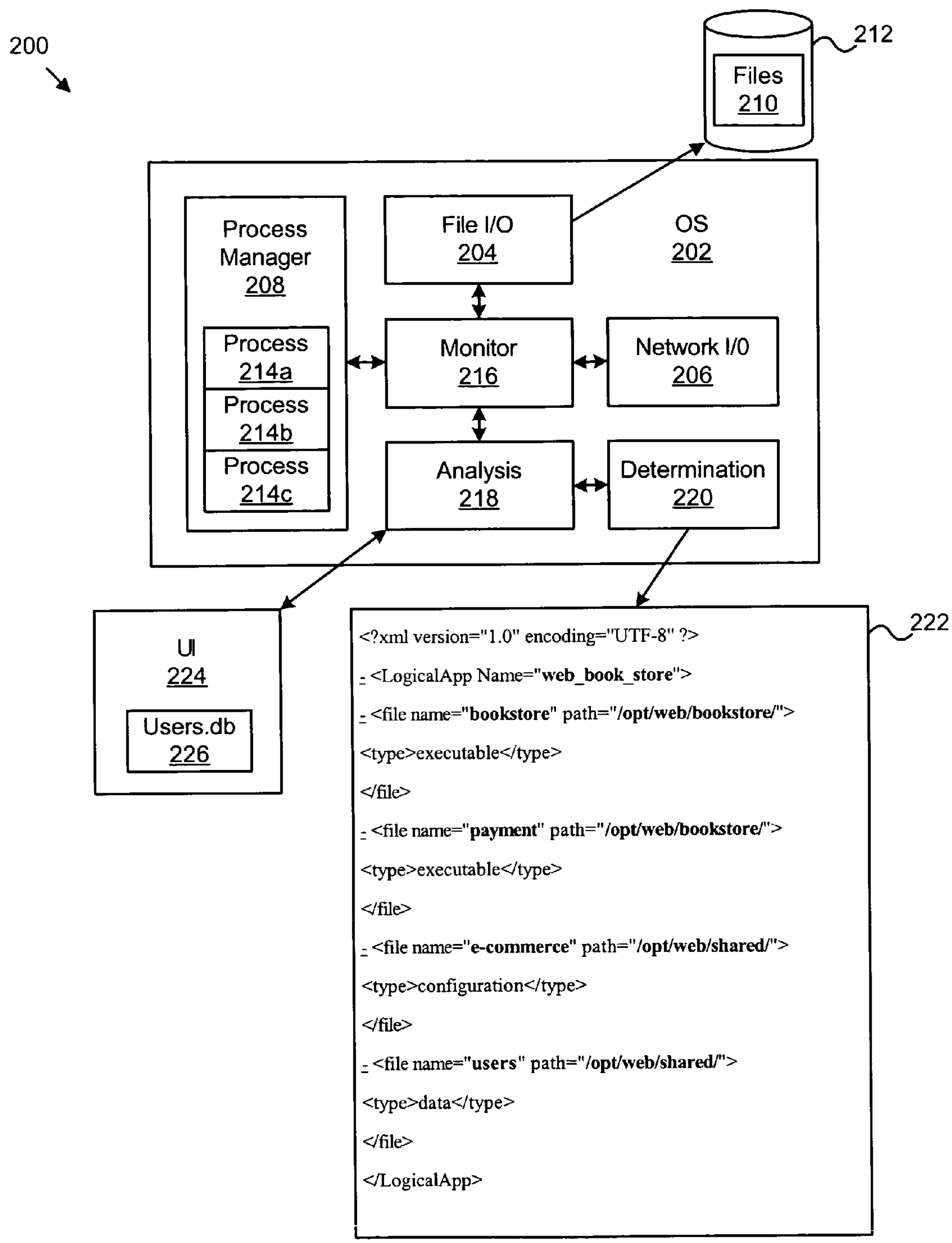
FIG. 2 is a logical block diagram illustrating one embodiment of a system for automatically discovering and grouping resources used by a business process in accordance with the present invention.

FIG. 2 illustrates a logical block diagram of an apparatus 200 configured to automatically discover and group files used by a business process. A business process may be executed by a wide array of hardware and software components configured to cooperate to provide the desired business services. (i.e. email services, retail web storefront, inventory management, etc.) For clarity, certain well-known hardware and software components are omitted from FIG. 2.

The business process may include an operating system 202 that provides general computing services through a file I/O module 204, network module 206, and process manager 208. The file I/O module 204 manages low-level reading and writing of data to and from files 210 stored on a storage device 212 such as a hard drive. Of course the storage device 212 may also comprise a storage subsystem such as various types of DASD systems. The network module 206 manages network communications between processes 214 executing on the apparatus 200 and external computer systems accessible via a network (not shown). Preferably, the file I/O module 204 and network module 206 are modules provided by the operating system 202 for use by all processes 214*a-c*. Alternatively, custom file I/O module 204 and network modules 206 may be written where an operating system 202 does not provide these modules.

The operating system 202 includes a process manager 208 that schedules use of one or more processors (not shown) by the processes 214*a-c*. The process manager 208 includes certain information about the executing processes 214*a-c*. In one embodiment, the information includes a process ID, a process name, a process owner (the user that initiated the process), process relation (how a process relates to other executing processes i.e. child, parent, sibling), other resources in use (open files or network ports), and the like.

Typically, the business process is defined by one or more currently executing processes 214*a-c*. Each process 214 includes either an executable file 210 or a parent process, which initially creates the process 214. Information provided by the process manager 208 enables identification of the original source files 210 for the executing processes 214*a-c*, discussed in more detail below.

In certain embodiments, the apparatus 200 includes a monitoring module 216, analysis module 218, and determination module 220. These modules 216, 218, 220 cooperate to dynamically identify the resources that comprise a logical application that corresponds to the business process. Typically, these resources are files 210. Alternatively, the resources may be other software resources (servers, daemons, etc) identifiable by a network address such as a URL or IP address.

The monitoring module 216 communicates with the process manager 208, file I/O module 204, and network I/O module 206 to collect trace data. The trace data is any data indicative of operational behavior of a software application (as used herein "application" refers to a single process and "logical application" refers to a collection of one or more processes that together implement a business process).

Trace data may be identifiable both during execution of a software application or after initial execution of a software application. One example of a monitoring module 216 that may be used with the present invention is a file filter module described in U.S. patent application Ser. No. 10/681,557, filed on Oct. 7, 2003, entitled "Method, System, and Program for Processing a File Request," hereby incorporated by reference. Certain trace data may also be identifiable after the initial installation of a software application. For example, software applications referred to as installation programs can create trace data simply by creating new files in a specific directory.

Preferably, the monitoring module 216 collects trace data for a desired business process. In one embodiment, the monitoring module 216 collects trace data based on an identifier, discussed in more detail below, known to directly relate to a resource implementing the business process. Alternatively, the monitoring module 216 may collect trace data for all the resources of an apparatus 200 without distinguishing based on an identifier.

In one embodiment, the monitoring module 216 communicates with the process manager 208 to collect trace data relating to processes 214 currently executing. The trace data collected represents processes 214*a-c* executing at a specific point in time. Because the set of executing processes 214*a-c* can change relatively frequently, the monitoring module 216 may periodically collect trace data from the process manager 208. Preferably, a user-configurable setting determines when the monitoring module 216 collects trace data from the process manager 208.

The monitoring module 216 also communicates with the file I/O module 204 and network module 206 to collect trace data. The file I/O module 204 maintains information about file access operations including reads, writes, and updates. From the file I/O module 204, the monitoring module 216 collects trace data relating to current execution of processes 214 as well as historical operation of processes 214.

Trace data collected from the file I/O module 204 may include information such as file name, file directory structure, file size, file owner/creator, file access rights, file creation date, file modification date, file type, file access timestamp, what type of file operation was performed (read, write, update), and the like. In one embodiment, the monitoring module 216 may also determine which files 210 are currently open by executing processes 214. In certain embodiments, the monitoring module 216 collects trace data from a file I/O module 204 for one or more file systems across a plurality of storage devices 212.

As mentioned above, the monitoring module 216 may collect trace data for all files 210 of a file system or only files and directories clearly related to an identifier. The identifier and/or resources presently included in a logical application may be used to determine which trace data is collected from a file system.

The monitoring module 216 collects trace data from the network I/O module 206 relating to network activity by the processes 214*a-c*. Certain network activity may be clearly related to specific processes 214 and/or files 210. Preferably, the network I/O module 206 provides trace data that associates one or more processes 214 with specific network activity. A process 214 conducting a network activity is identified and the resource that initiated the process 214 is thereby also identified.

Trace data from the network I/O module 206 may indicate which process 214 has opened specific ports for conducting network communications. The monitoring module 216 may collect trace data for well-known ports, which are used by processes 214 to perform standard network communications. The trace data may identify the port number and the process 214 that opened the port. Often only a single, unique process uses a particular network port.

For example, communications over port 80 may be used to identify a web server on the apparatus 200. From the trace data, the web server process and executable file may be identified. Other well-known ports include 20 for FTP data, 21 for FTP control messages, 23 for telnet, 53 for a Domain Name Server, 110 for POP3 email, etc.

In certain operating systems 202 such as UNIX and LINUX network I/O trace data is stored in a separate directory. In other operating systems 202 the trace data is collected using services or daemons executing in the background managing the network ports.

In one embodiment, the monitoring module 216 autonomously communicates with the process manager 208, file I/O module 204, and network I/O module 206 to collect trace data. As mentioned, the monitoring module 216 may collect different types of trace data according to different user-configurable periodic cycles. When not collecting trace data, the monitoring module 216 may "sleep" as an executing process until the time comes to resume trace data collection. Alternatively, the monitoring module 216 may execute in response to a user command or command from another process.

The monitoring module 216 collects and preferably formats the trace data into a common format. In one embodiment, the format is in one or more XML files. The trace data may be stored on the storage device 212 or sent to a central repository such as a database for subsequent review.

The analysis module 218 analyzes the trace data to discover resources that are affiliated with a business process. Because the trace data is collected according to operations of software components implementing the business process, the trace data directly or indirectly identifies resources required to perform the services of the business process. By identifying the resources that comprise a business process, business management policies can be implemented for the business process as a whole. In this way, business policies are much simpler to implement and more cost effective.

In one embodiment, the analysis module 218 applies a plurality of heuristic routines to determine which resources are most likely associated with a particular logical application and the business process represented by the logical application. The heuristic routines are discussed in more detail below. Certain heuristic routines establish an association between a resource and the logical application with more certainty than others. In one embodiment, a user may adjust the confidence level used to determine whether a candidate resource is included within the logical application. This confidence level may be adjusted for each heuristic routine individually and/or for the analysis module 218 as a whole.

The analysis module 218 provides the discovered resources to a determination module 220, which defines a logical application comprising the discovered resources. Preferably, the determination module 220 defines a structure 222 such as a list, table, software object, database, a text eXtended Markup Language (XML) file, or the like for recording associations between discovered resources and a particular logical application. As mentioned above, a logical application is a collection of resources required to implement all aspects of a particular business process.

The structure 222 includes a name for the logical application and a listing of all the discovered resources. Preferably, sufficient attributes about each discovered resource are included such that business policies can be implemented with the resources. Attributes such as the name, location, and type of resource are provided.

In addition, the structure 222 may include a frequency rating indicative of how often the resource is employed by the business process. In certain business processes this frequency rating may be indicative of the importance of the resource. In addition a confidence value determined by the analysis module 218 may be stored for each resource.

The confidence level may indicate how likely the analysis module 218 has determined that this resource is properly associated with the given logical application. In one embodiment, this confidence level is represented by a probability percentage. For certain resources, the structure 222 may include information such as a URL or server name that includes resources used by the business process but not directly accessible to the analysis module 218.

Preferably, the analysis module 218 cooperates with the determination module 220 to define a logical application based on an identifier for the business process. In this manner, the analysis module 218 can use the identifier to filter the trace data to a set more likely to include resources directly related to a business process of interest. Alternatively, the analysis module 218 may employ certain routines or algorithms to propose certain logical applications based on clear evidence of relatedness from the trace data as whole without a predefined identifier.

A user interface (UI) 224 may be provided so that a user can provide the identifier to the analysis module 218. The identifier 226 may comprise one of several types of identifiers including a file name for an executable or data file, file name or process ID for an executing process, a port number, and the like. The resource identified by the identifier 226 may be considered a seed resource for the logical application as the resource identified by the identifier 226 is included in the logical application by default and is used to add additional resources discovered by searching the trace data.

For example, a user may desire to create a logical application according to which processes accessed the data base file "Users.db." In the UI 224, the user enters the file name users.db. The analysis module 218 then searches the trace data for processes that opened or closed the users.db file. Heuristic routines are applied to any candidate resources identified and the result set of resources is presented to the user in the UI 224.

The result set includes the same information as in the structure 222. The UI 224 may also allow the user to modify the contents of the logical application by adding or removing certain resources. The user may then store a revised logical application in a human readable XML structure 222. In addition, the user may adjust confidence levels for the heuristic routines and the analysis module 218 overall.

In this manner, the apparatus 200 allows for creation of logical applications that correspond to business processes. The logical applications track information about resources that implement the business process to a sufficient level of detail that business level policies such as backup, recovery, migration, and the like may be easily implemented. Furthermore, logical application definitions can be readily adjusted and adapted as subsystems implementing a business process are upgraded, replaced, and modified. The logical application tracks business data as well as the processes that operate on that business data. In this manner, business data is fully archivable for later use without costly conversion and data extraction procedures.

Figure 3:
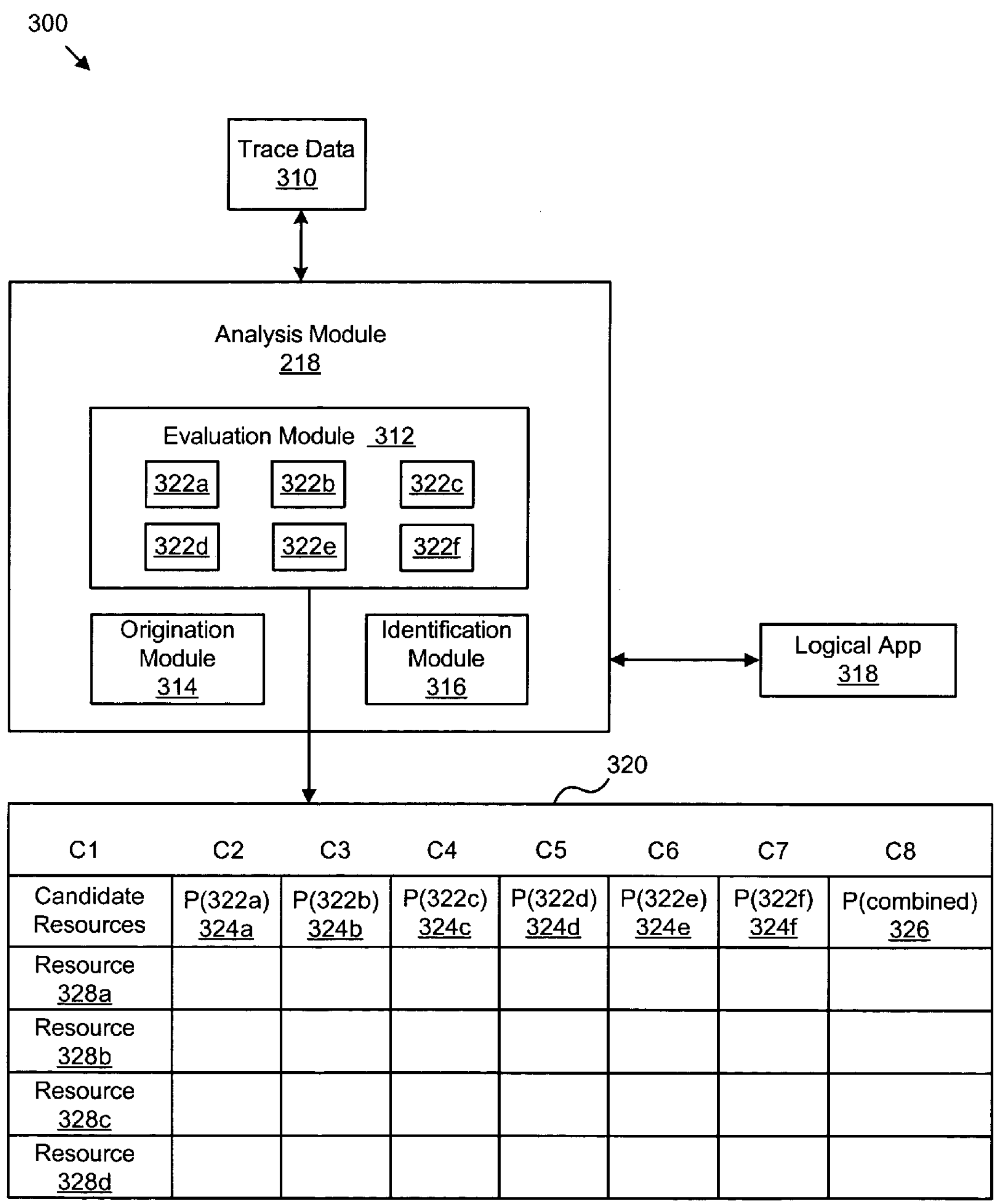
FIG. 3 is a schematic block diagram illustrating one embodiment of an apparatus for analyzing the association of a resource to a business process of the present invention.

FIG. 3 illustrates one embodiment of an apparatus for analyzing the association of a resource to a business process. The illustrated embodiment includes an analysis module 218, which includes an evaluation module 312, an origination module 314, and an identification module 316. The analysis module 218 examines trace data 310 associated with a logical application 318 to determine a set of candidate resources. Candidate resource identifiers 328*a-d* for the candidate resources may be entered into a candidate resource data structure 320.

In one embodiment, the origination module 314 may receive an identifier that relates to a business process. Preferably, the identifier is unique to the business process although uniqueness is not required. The identifier provides a starting point for conducting the analysis of trace data. In one embodiment, an identifier is known to be associated with the business process and is automatically associated with the corresponding logical application 318. The identifier may be a seed for determining which other resources are also associated with the logical application 318. Alternatively, an association between the identifier an a particular logical application 318 may be suspected. However, after conducting the analysis the correct associated logical application 318 may be discovered as well as other resources associated with that logical application 318.

The identifier may be a file name for a key executable file known to be involved in a particular business process. Alternately, the identifier may be a process ID, a process name, a process identifier, a network socket, or the like. For example, the identifier may comprise the fact that a software application always conducts network I/O over port 80. An example identifier may be the inventorystartup.exe which is the first application started when an inventory control system is initiated.

The origination module 314 may search system information and trace data 310 to determine a resource that is directly related to the business process identifier. For example, if the identifier is a process name, the origination module 314 may determine a parent process and subsequently determine a resource that initiated the parent process. In some embodiments, the origination module 314 associates the resource to a logical application 318 as an initial member of the logical application 318.

The evaluation module 312 may apply one or more heuristic routines 322*a-f* to a set of trace data 310. Preferably, the trace data 310 is related to the logical application 318. Alternatively, the heuristic routines 322*a-f* are applied to all available trace data 310. In one embodiment, the evaluation module 312 uses the heuristic routines 322*a-f* in conjunction with members of the logical application 318. Each heuristic routine 322*a-f* may analyze the trace data in relation to the members of the logical application 318. A heuristic routine 322*a-f* is an algorithm that examines trace data 310 using a member of the logical application 318. The heuristic routine 322*a-f* seeks to identify candidate resources for which the trace data 310 indicates a potential relationship between a candidate resource and members of the logical application 318. Because the relationship is heuristically determined, the heuristic routine 322*a-f* assigns a probability that a candidate resource is associated to the logical application 318. This determination is very complex and difficult given such little information, about the logical application 318. Consequently, a plurality of heuristics of different probabilities are applied to provide as accurate of a determination as possible.

As used herein, the term "heuristic" means "a technique designed to solve a problem that ignores whether the solution is probably correct, but which usually produces a good solution or solves a simpler problem that contains or intersects with the solution of the more complex problem." (See definition on the website www wikipedia org).

In one embodiment, an initial set of heuristic routines 322*a-f* is provided and a user is permitted to add his/her own heuristic routines 322*a-f*. Once a heuristic routine 322*a-f* identifies a resource that may be associated with the logical application 318, the candidate resource may be added to a set of candidate resources as an entry into the candidate resource data structure 320. The depicted embodiment of the candidate resource data structure 320 includes a row for each candidate resource 328*a-d* and a column for the probability 324*a-f* assigned by each heuristic routine 322*a-f*. A column is included for a combined probability 326 that may be a weighted average or a weighted product of each of the individual probabilities 324*a-f* for each candidate resource 328*a-d*.

One heuristic routine 322*a* may identify all resources that are used by a member of the logical application 318. Another heuristic routine 322*b* may identify all resources within a parent directory of a resource used by a member of the logical application 318. Another heuristic routine 322*c* may identify all resources within all directories owned by a member of the logical application 318.

One heuristic routine 322*d* may identify all resources in a package manager group that includes a member of the logical application 318. Another heuristic routine 322*e* may identify resources that were used within a selected time interval after initial execution of a member of the logical application 318. One heuristic routine 322*f* may identify all resources that match a user-defined criterion. These rules may include or exclude certain resources based on site-specific procedures that exist at a computer facility. For example, a user may exclude resources of a temporary nature or with a .tmp file extension from the candidate resource data structure 320. Heuristic routines 322 may be added or deleted by a user of the system.

In one embodiment, a candidate resource 328 identified by the heuristic routines 322 is added as a row in a candidate resource data structure 320. Each heuristic routine 322*a-f* assigns a probability 324*a-f* to each resource 328 *a-d* based upon a likelihood that a specific heuristic routine 322*a-f* correctly identified the resource 328 *a-d* as being associated with the logical application 318. For example, if a member of the logical application 318 used a candidate resource 328*a*, it is highly probable that the candidate resource 328*a* is associated with the logical application 318. Alternately, if a candidate resource 328 was used within a specified time period after initiation of a member of the logical application 318, it is not as probable that the candidate resource 328*a* is associated with the logical application 318 since there is a chance that the resource use was associated with a different process that happened to be executing concurrently.

The evaluation module 312 combines the individual probabilities 324*a-f* for each candidate resource 328*a-d* to produce a combined probability 326 for each candidate resource 328*a-d*. In one embodiment, the combined probability 326 comprises the product of the individual probabilities 324*a-f*. In another embodiment, certain columns or values may be given a higher weighting value during the combination of probabilities. For example, if a probability of 100% is assigned by a heuristic routine, the associated candidate resource 328*a-d* may automatically be associated with the logical application regardless of the probability values 324*a-f* in other columns.

Candidate resources 328*a-d* may be evaluated according two distinct methodologies. The first methodology is referred to as a build-up scheme. Under this methodology, the heuristic routines 322*a-f* are applied to augment the set of resources currently within the logical application 318. In this manner, the resource that is directly related to the business process identifier, the seed, grows into a network of associated resources as the heuristic routines 322*a-f* are applied and the combined probabilities 326 are derived. Use of the build-up scheme represents confidence that the heuristic routines 322*a-f* will not miss relevant resources and runs the risk that some resources may be missed. However, this scheme may exclude unnecessary resources.

The second methodology, referred to as the whittle-down scheme, is more conservative but may include resources that are not actually associated with the logical application. The whittle-down scheme begins with a logical application 318 comprising a pre-defined superset such as all resources that are accessible to the computer system(s) implementing the business process. The heuristic routines 322*a-f* are then applied using an inverse operation, meaning resources that satisfy a heuristic routine 330*a-f* are removed from the logical application 319. Regardless of the methodology used, the analysis module 218 produces a set of candidate resources 328, which are likely to represent members of the logical application 318.

Preferably, the analysis module 218 is configured to apply the heuristic routines 322*a-f* for each resource presently included in the logical application 318. In some embodiments, after the analysis module 218 identifies additional resources as members of the logical application 318, the analysis may be re-run against the expanded logical application 318. In one embodiment, a determination to re-run the analysis may be based on a user configurable percentage of change in the logical application 318 between iterations of the analysis module 218. Alternatively, a user-configurable setting may determine a pre-defined number of iterations.

In this manner, the logical application 318 continues to grow or shrink based on relationships between recently added or subtracted resources and resources already present in the logical application 318. The logical application 318 may be said to be stable if the membership within the logical application 318 changes very little between iterative applications of the analysis module 218.

Figure 4:
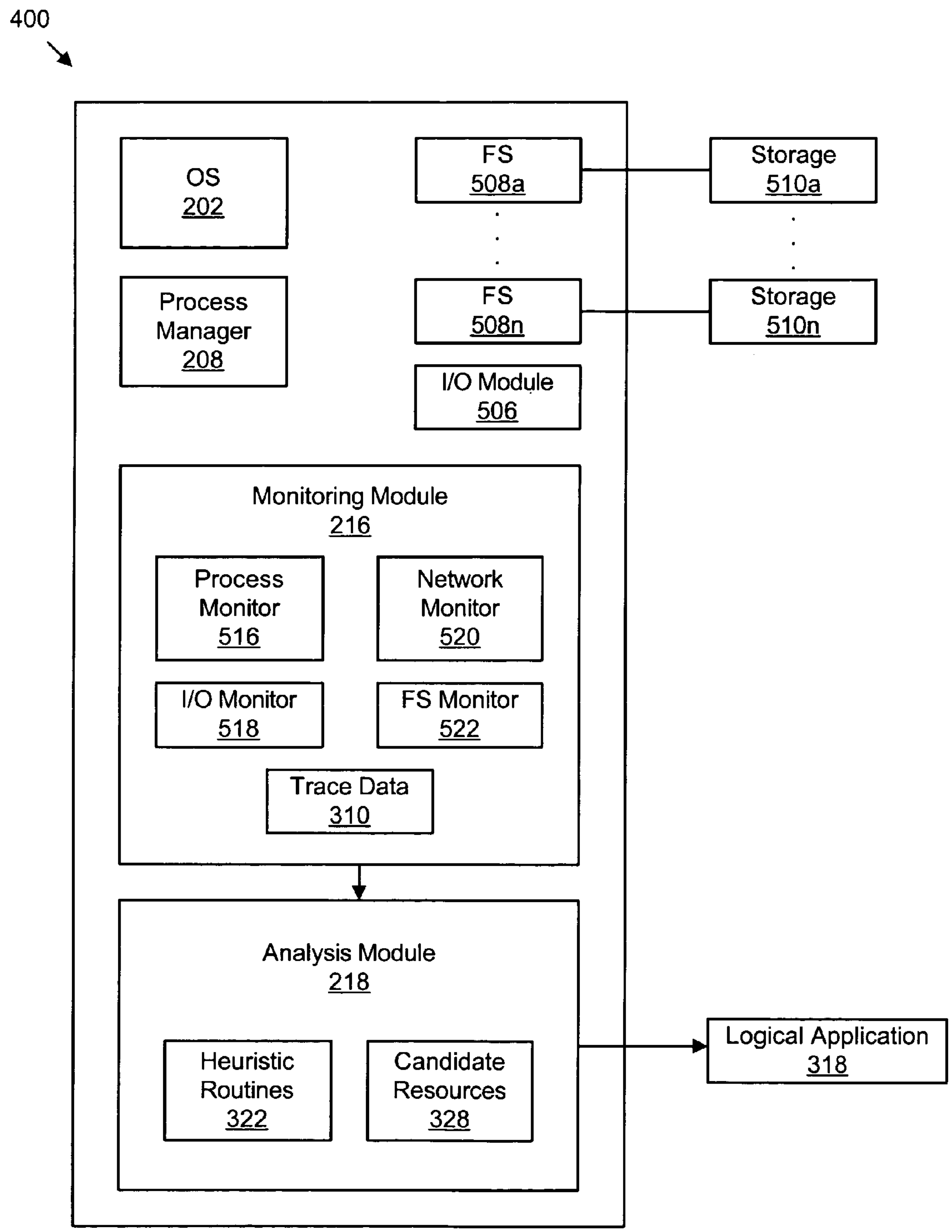
FIG. 4 is a schematic block diagram illustrating a system for analyzing the association of a resource to a business process in accordance with the present invention.

FIG. 4 illustrates one embodiment of a system 400 for analyzing the association of a resource to a business process in accordance with the present invention. The system 400 includes an operating system 202, a process manager 208, and I/O module 506. The operating system 202 manages execution of processes. The process manager 208 provides information on running processes. The I/O module 506 provides information on file activity.

The system 400 may include a plurality of file systems (FS) 508*a-n* that use corresponding storage devices 510*a-n*. The I/O module 506 may provide file information for all the file systems 508*a-n*.

A monitoring module 216 collects trace data 310 during execution of software applications by the operating system 202. The monitoring module 216 may interact with the process manager 208, I/O module 506, and file systems 508*a-n* to collect trace data 310. To collect certain types of trace data 310, the monitor module 216 may include a process monitor 516, I/O monitor 518, network monitor 520, and FS monitor 522.

The monitoring module 216 provides the trace data 310 to an analysis module 218 which analyzes the trace data 310 to discover resources affiliated with a business process. The analysis module 218 may also define a logical application 318. The logical application 318 may be defined within a markup language data structure such as XML.

The system 400 automatically discovers the resources (files, ports, etc.) used by a business process in a single system. Typically, business processes are implemented using a plurality of software applications. Even a single software application can have a high number of resources stored in various known and unknown locations on the same system. The system 400 automatically identifies the logical application that corresponds to the business process.

In certain instances, this logical application corresponds to a single software application. Because a logical application is automatically discovered, operations can be performed on the logical application as a whole rather than on sub-systems and sub-modules independently. These operations may include upgrading a logical application, deleting a logical application, backing up a logical application, and the like.

Figure 5:
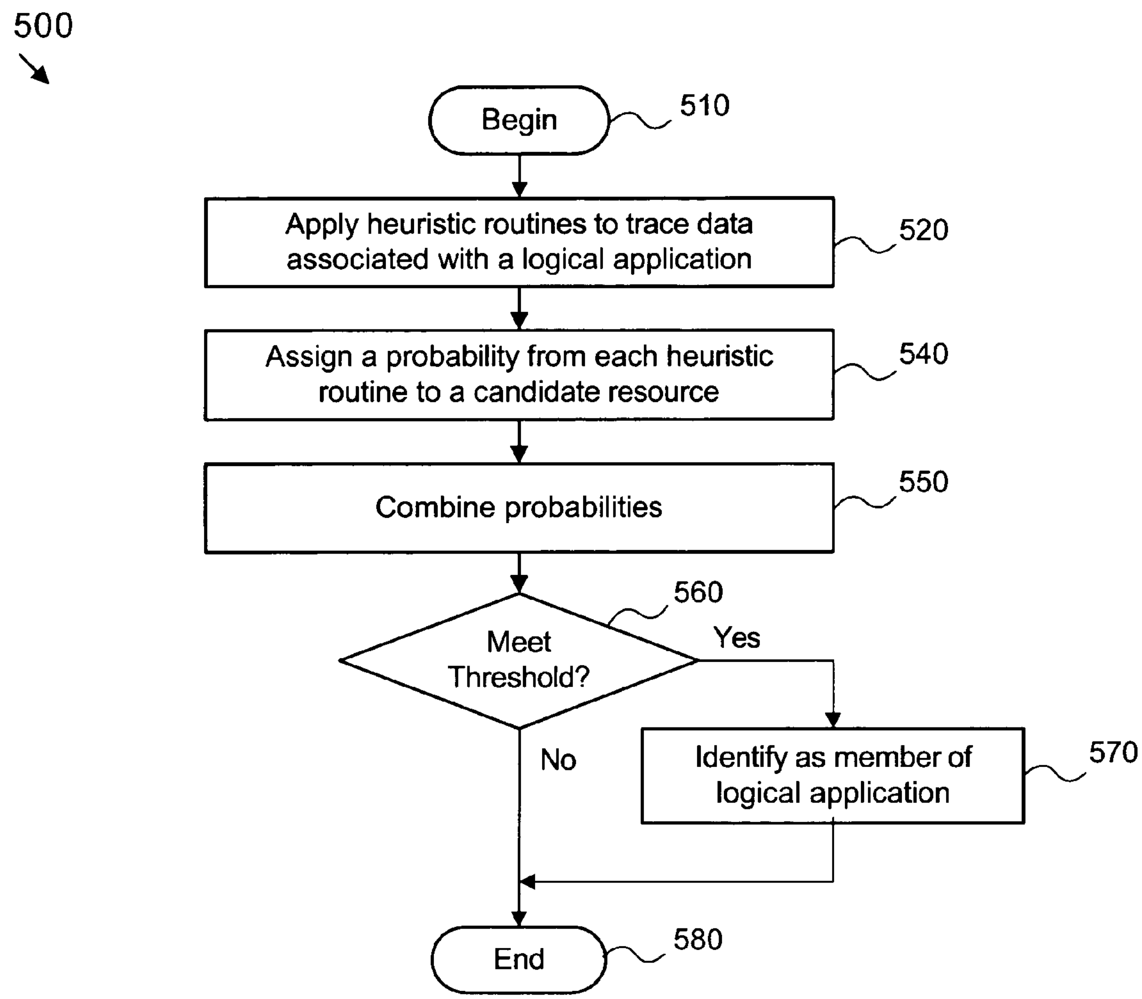
FIG. 5 is a schematic flow chart diagram illustrating a method for analyzing the association of a resource to a business process in accordance with the present invention.

FIG. 5 illustrates one embodiment of a flow chart of a method 500 for analyzing the association of a resource to a business process. The method 500 begins 510 after a candidate resource 328 has been selected for analysis. The evaluation module 312 applies 520 one or more heuristic routines 322*a-f* to trace data 310 associated with members of a logical application 318. Each heuristic routine 322*a-f* assigns 540 a probability that the candidate resource 328 is associated to the logical application 318.

The evaluation module 312 then combines 550 the probabilities assigned by the heuristic routines 322*a-f* to derive a combined probability 326. In one embodiment, the evaluation module 312 derives the combined probability 326 by taking the product of the individual probabilities 324. In another embodiment, certain probabilities 324 may be given a higher weighting during the combination of probabilities. For example, if a probability of 100% is assigned by one heuristic routine 322, the candidate resource 328 may be assigned a combined probability of 100% regardless of the probability values from other heuristic routines.

If the combined probability 326 does not meet 560 a predefined threshold, the method 500 ends 580. If the combined probability meets 560 a predefined threshold, the candidate resource 328 is identified 570 as a member of the logical application, and the method 500 ends 580.

Figure 6:
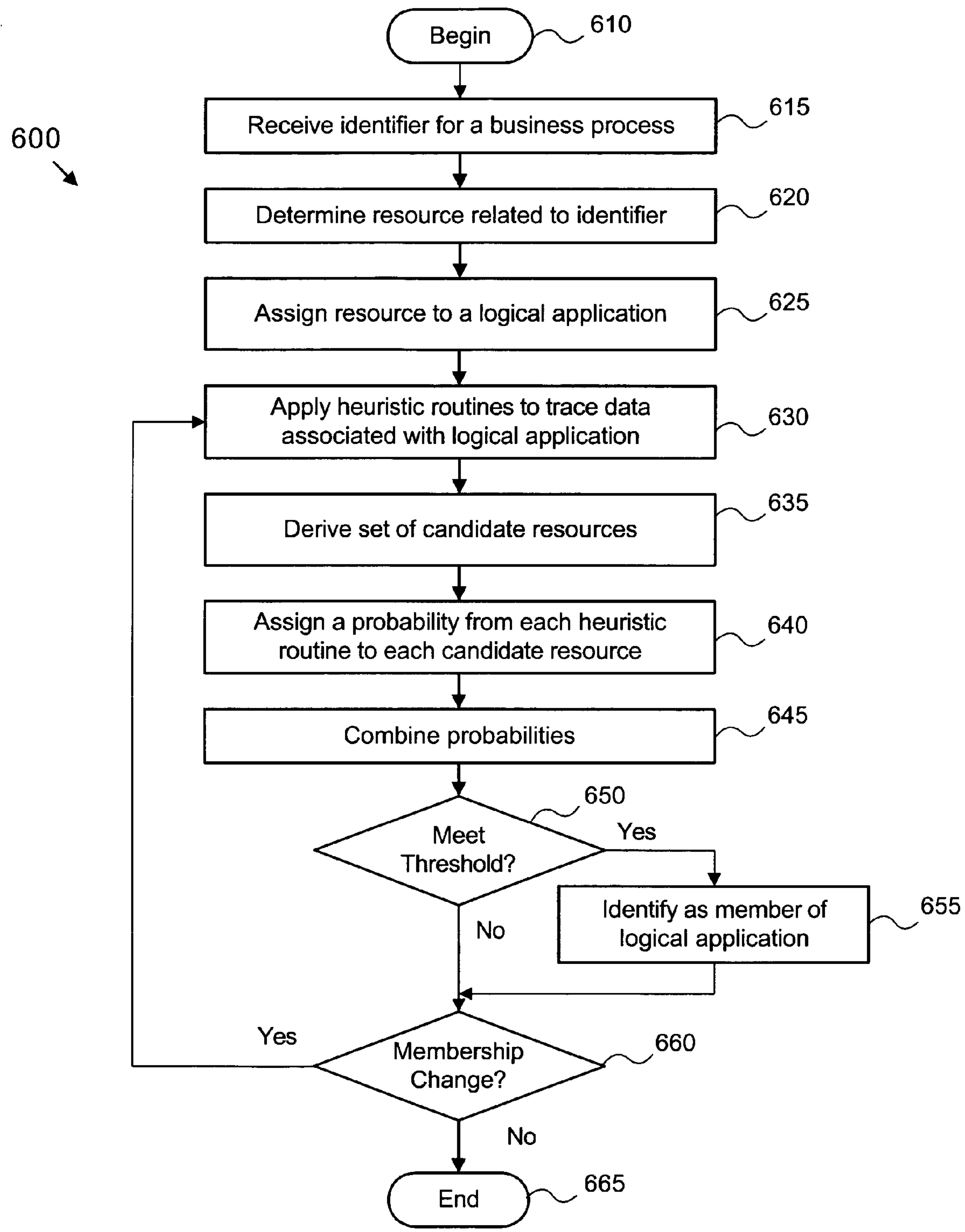
FIG. 6 is a schematic flow chart diagram illustrating a method for identifying members of a logical application in accordance with the present invention.

FIG. 6 illustrates one embodiment of a flow chart of a method 600 for identifying members of a logical application. The method 600 begins 610 by receiving 615 an identifier for the business process. In some embodiments, the identifier is received from a system user. Preferably, the identifier is unique to the business process although uniqueness is not required. The identifier provides a starting point for conducting the analysis of trace data 310. In one embodiment, an identifier is known to be associated with the business process and is automatically associated with a corresponding logical application 318. The identifier may be a seed for determining which other resources are also associated with the logical application 318.

The identifier may be a file name for a key executable file known to be involved in a particular business process. Alternately, the identifier may be a process ID, a process name, a process identifier, a network socket, or the like. For example, the identifier may comprise the fact that a software application always conducts network I/O over port 80. Another example identifier may be the inventorystartup.exe filename identifier which is the first application started when an inventory control system is initiated.

The origination module 314 determines 620 a resource known to have a direct affiliation with the identifier. The origination module 314 may search trace data 310 and/or system information to determine the resource that implements at least a portion of the business process associated with the identifier. System information may include resource related information. For example, system information may include the contents of directories and relationships between files and directories in a file system. System information may also include the listing of current processes running as well as relationships between processes and logs of permitted and prohibited network activity.

The origination module 314 may use the identifier as a starting point to search relationships in the trace data 310 or system information that lead back to a resource associated with the business process. For example, if the identifier is a process name, the origination module 314 may determine a resource that initiated the process. If the identifier is a port name, the origination module 314 may determine a process that is listening on the port, then identify the resource that initiated the process. The search may entail examining a sequence of process relationships recorded in the trace data 310 to discover the resource that is associated with the business process.

In some embodiments, a portion of the trace data 310 may include a list of all program executables that are uniquely associated with business processes. The list may exclude program executables that are shared between business processes, such that identification of a program executable on the list provides a unique identification of a resource associated with a business process. The origination module 314 may continue to search relationships of processes and resources to the identifier until a match is found with one of the list entries. For example, an operating system process that is common to many business processes may open a port. The parent process may also be common to multiple business processes. A search through a sequence of parent processes and resources associated with the parent processes may be conducted until a resource on the list of unique program executables is identified. Alternatively, these shared resources may also be identified as being associated with a logical application.

The method 600 assigns 625 the resource to a logical application 318. In some embodiments, the origination module 314 assigns 625 the resource to a logical application 318 as an initial member of the logical application 318. The evaluation module 312 applies 630 heuristic routines 322*a-f* to trace data 310 associated with members of the logical application 318 to derive 635 a set of candidate resources 328*a-d* that may be associated with the logical application 318.

An example of a heuristic routine 322 is the identification of resources that are accessed by any member of the logical application 318. In one embodiment, the trace data 310 is searched to identify each resource that was accessed by any member of the logical application 318. Identified resources may be placed in a list. The list may be compared with resources already in the logical application 318 and redundancies may be eliminated. The remaining resources preferably become candidate resources 328*a-d*. Another example of a heuristic routine 322 is the identification of resources that are in a directory wherein a member of the logical application 318 resides. In one embodiment, the trace data 310 is searched to identify the parent directory of each member of the logical application 318, and all non-redundant resources in the parent directories become candidate resources 328*a-d*.

The heuristic routines 322*a-f* may assign 640 a probability 324*a-f* to each candidate resource 328*a-d* based upon the degree to which the resource satisfies criteria of the heuristic routine 322*a-f*. Alternately, the heuristic routines 322*a-f* may assign a probability 324*a-f* based upon the probability that satisfaction of criteria indicate association of the resource to the logical application 318.

The evaluation module 312 then combines 645 the probabilities assigned by the heuristic routines 322*a-f* to derive a combined probability 326 for each candidate resource 328*a-d*. In one embodiment, the evaluation module 312 derives the combined probability 326 by taking a product of the individual probabilities 324*a-f*. In another embodiment, certain probabilities 324*a-f* are given a higher weighting during the combination of probabilities. For example, if one heuristic routine 322*a-f* assign a probability of 100%, the candidate resource 328*a-d* may be assigned a combined probability 326 of 100% regardless of the probability values from other heuristic routines.

The combined probability 326 for each candidate resource 328*a-d* is examined. If the candidate resource 328*a-d* combined probability 326 meets 650 a predefined threshold, the candidate resource 328*a-d* is identified 655 as a member of the logical application 318. If membership of the logical application 318 changes 660 by addition of candidate resource 328*a-ds*, control is transferred to step 630 where the evaluation module 312 applies heuristic routines 322*a-f* to the expanded membership of the logical application 318. If the membership of the logical application 318 does not change 660 or if the degree of change is below a specified threshold, the method 600 ends 665. Alternatively, in some embodiments, rather than repeating the analysis loop (steps 630 to step 660) until no more resources are added, or only a few new resources are added, the method 600 may repeat the analysis for a predetermined, user-defined, number of iterations.

Of course the method 600 may be modified by those of skill in the art without departing from the essence of the present invention. All such modifications are considered within the scope of the present invention.

In summary, the present invention provides an apparatus, system, and method for analyzing the association of a resource to a business process. The apparatus, system, and method automatically discovers substantially all the resources used by a business process such that a business level policy can be applied to the business process as a whole. In addition, the apparatus, system, and method applies heuristic routines to ensure that all the appropriate resources are included. Furthermore, the set of resources identified as affiliated with a business process is modifiable to accommodate user needs and system changes over time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for identifying resources associated with a computer process, the apparatus comprising:

a storage device storing executable code;

a processor executing the executable code, the executable code comprising:

an origination module that derives an initial member of a logical application that implements a business process from a business process identifier received by the origination module, wherein the business process identifier is provided by a user and is a file name for an executable file;

a monitoring module that collects trace data, the trace data comprising a port number for a port and a process that opened the port;

a determination module that stores the candidate resources in an eXtended Markup Language (XML) file, the XML file comprising a logical name for the business process and each candidate resource, a frequency rating indicating how often each candidate resource is employed by the business process, and a confidence value comprising a combined probability;

an evaluation module that applies one or more heuristic routines to the trace data associated with the logical application, each heuristic routine deriving a set of candidate resources and assigning a plurality of probabilities to each candidate resource of the set indicating a likelihood that the candidate resource is a file used to implement the business process, a first heuristic routine assigning a high probability value to a first probability for each candidate resource that is used within a selected time interval after an initial execution of the logical application, a second heuristic routine assigning the high probability value to a second probability for each candidate resource within all directories owned by the initial member, a third heuristic routine assigning the high probability value to a third probability for each candidate resource within each parent directory of each resource used by the initial member, and a fourth heuristic routine assigning the high probability to a fourth probability for each candidate resource within directories owned by the initial member, the evaluation module combining the probability values assigned to the candidate resource by each heuristic routine by calculating a product of the probability values to define the combined probability for the candidate resource;

an identification module that identifies the candidate resource as a member of the logical application in response to the combined probability satisfying a threshold value.

2. The apparatus of claim 1, wherein the business process identifier is selected from tie group consisting of a network socket, a process name, a process identifier, a universal resource locator (URL), and a file.

3. The apparatus of claim 1, wherein one heuristic routine derives the set of candidate resources comprising resources matching a user-defined criterion.

4. The apparatus of claim 1, wherein the evaluation module is further configured to remove a candidate resource from the set of candidate resources in response to a result from the heuristic routine.

5. A system for analyzing the association of a resource to a business process, comprising:

a storage device storing executable code;

a processor executing the executable code, the executable code comprising:

an operating system managing execution of processes;

a process manager providing information on running processes;

an Input/Output (I/O) module providing file activity information;

a file system managing files stored in storage and providing metadata about the files;

a monitoring module collecting trace data during execution of at least one software process within the operating system, the monitoring module interacting with at least one of the process manager, the I/O module, and the file system to collect trace data directly related to operation of a software application, the trace data comprising a port number for a port and a process that opened the port;

a determination module storing the candidate resources in an XML file, the XML file comprising a logical name for the business process and each candidate resource, a frequency rating indicating how often each candidate resource is employed by the business process, and a confidence value comprising a combined probability;

an analysis module comprising:

an origination module that derives an initial member of a logical application that implements a business process from a business process identifier received by the origination module, wherein the business process identifier is provided by a user and is a file name for an executable file, an evaluation module that applies one or more heuristic routines to the trace data associated with the logical application, each heuristic routine deriving a set of candidate resources and assigning a plurality of probabilities to each candidate resource of the set indicating a likelihood that the candidate resource is a file used to implement the business process, a first heuristic routine assigning a high probability value to a first probability for each candidate resource that is used within a selected time interval after an initial execution of the logical application, a second heuristic routine assigning the high probability value to a second probability for each candidate resource within all directories owned by the initial member, a third heuristic routine assigning the high probability value to a third probability for each candidate resource within each parent directory of each resource used by the initial member, and a fourth heuristic routine assigning the high probability to a fourth probability for each candidate resource within directories owned by the initial member, the evaluation module combining the probability values assigned to the candidate resource by each heuristic routine by calculating a product of the probability values to define the combined probability for the candidate resource, and an identification module that identifies the candidate resource as a member of the logical application in response to the combined probability satisfying a threshold value.

6. The system of claim 5, wherein the analysis module is further configured to add a candidate resource in response to a result from a heuristic routine.

7. The system of claim 5, wherein the monitoring module interacts with a plurality of file systems.

8. A storage device storing executable code executed by a processor to perform operations for analyzing the association of a software resource to a business process comprising:

deriving an initial member of a logical application that implements a business process from a business process identifier, wherein the business process identifier is provided by a user and is a file name for an executable file;

collecting trace data, the trace data comprising a port number for a port and a process that opened the port;

storing the candidate resources in an XML file, the XML file comprising a logical name for the business process and each candidate resource, a frequency rating indicating how often each candidate resource is employed by the business process, and a confidence value comprising a combined probability;

applying at least one heuristic routine to the trace data associated with the logical application, each heuristic routine deriving a set of candidate resources and assigning a plurality of probabilities to each candidate resource of the set indicating a likelihood that the candidate resource is a file used to implement the business process, a first heuristic routine assigning a high probability value to a first probability for each candidate resource that is used within a selected time interval after an initial execution of the logical application, a second heuristic routine assigning the high probability value to a second probability for each candidate resource within all directories owned by the initial member, a third heuristic routine assigning the high probability value to a third probability for each candidate resource within each parent directory of each resource used by the initial member, and a fourth heuristic routine assigning the high probability to a fourth probability for each candidate resource within directories owned by the initial member;

combining the probability assigned to the candidate resource by each heuristic routine by calculating a product of the probability values to define the combined probability for the candidate resource; and identifying the candidate resource as a member of the logical application in response to the combined probability satisfying a threshold value.

9. The storage device of claim 8, wherein the business process identifier is selected from the group consisting of a network socket, a process name, a process identifier, a universal resource locator (URL), and a file.

10. The storage device of claim 8, the operations further comprising searching system information in order to determine the resource related to the business process identifier.

11. The storage device of claim 8, wherein one heuristic routine derives the set of candidate resources comprising resources accessed by the initial member.

12. The storage device of claim 8, wherein one heuristic routine comprises derives the set of candidate resources comprising all resources within each parent director of each resource used by the initial member.

13. The storage device of claim 8, wherein a third heuristic routine derives a third set of candidate resources comprising resources within a parent directory of each resource used by the initial member.

14. The storage device of claim 8, wherein one heuristic routine derives the set of candidate resources comprising all resources in a package manager group that includes the initial member.

15. The storage device of claim 8, wherein one heuristic routine derives the set of candidate resources comprising resources matching a user-defined criterion.

16. The storage device of claim 8, the operations further comprising removing a candidate resource from the set of candidate resources if the candidate resource is of a temporary nature.

17. A method for identifying resources associated with a business process, the method comprising:

deriving, by use of processor, an initial member of a logical application that implements a business process from a business process identifier provided by a user, wherein the business process identifier is provided by a user and is a file name for an executable file;

collecting trace data, the trace data comprising a port number for a port and a process that opened the port;

storing the candidate resources in an XML file, the XML file comprising a logical name for the business process and each candidate resource, a frequency rating indicating how often each candidate resource is employed by the business process, and a confidence value comprising a combined probability;

applying at least one heuristic routine to the trace data associated with the logical application, each heuristic routine deriving a set of candidate resources and assigning a plurality of probabilities to each candidate resource of the set indicating a likelihood that the candidate resource is a file used to implement the business process, a first heuristic routine assigning a high probability value to a first probability for each candidate resource that is used within a selected time interval after an initial execution of the logical application, a second heuristic routine assigning the high probability value to a second probability for each candidate resource within all directories owned by the initial member, a third heuristic routine assigning the high probability value to a third probability for each candidate resource within each parent directory of each resource used by the initial member, and a fourth heuristic routine assigning the high probability to a fourth probability for each candidate resource within directories owned by the initial member;

combining the probability values assigned to the candidate resource by each heuristic routine as a product of the probability values to define the combined probability for the candidate resource; and identifying the candidate resource as a member of the logical application in response to the combined probability satisfying a threshold value.

18. A storage device storing executable code executed by a processor to perform operations for analyzing the association of a software resource to a business process-comprising:

providing a means for deriving an initial member of a logical application that implements a business process from a business process identifier provided by a user, wherein the business process identifier is provided by a user and is a file name for an executable file;

providing a means for collecting trace data, the trace data comprising a port number for a port and a process that opened the port;

providing a means for storing the candidate resources in an XML file, the XML file comprising a logical name for the business process and each candidate resource, a frequency rating indicating how often each candidate resource is employed by the business process, and a confidence value comprising a combined probability;

providing a means for applying at least one heuristic routine to the trace data associated with the logical application, each heuristic routine deriving a set of candidate resources and assigning a plurality of probabilities to each candidate resource of the set indicating a likelihood that the candidate resource is a file used to implement the business process, a first heuristic routine assigning a high probability value to a first probability for each candidate resource that is used within a selected time interval after execution of the logical application, a second heuristic routine assigning the high probability value to a second probability for each candidate resource within all directories owned by the initial member, a third heuristic routine assigning the high probability value to a third probability for each candidate resource within each parent directory of each resource used by the initial member, and a fourth heuristic routine assigning the high probability to a fourth probability for each candidate resource within directories owned by the initial member;

providing a means for combining the probability assigned to the candidate resource by each heuristic routine as a product of the probability values to define the combined probability for the candidate resource; and providing a means for identifying the candidate resource associated with the logical application in response to the combined probability satisfying a threshold value.

19. The apparatus of claim 1, the evaluation module further applying a fifth heuristic routine assigning the high probability value to a fifth probability for each candidate resource used within a specified time period.

20. The system of claim 5, the evaluation module further applying a fifth heuristic routine assigning the high probability value to a fifth probability for each candidate resource used within a specified time period.

21. The storage device of claim 8, the operations further comprising applying a fifth heuristic routine assigning the high probability value to a fifth probability for each candidate resource used within a specified time period.

22. The method of claim 17, the method further comprising applying a fifth heuristic routine assigning the high probability value to a fifth probability for each candidate resource used within a specified time period.

* * * * *